US010078436B2

(12) United States Patent
Wu et al.

(10) Patent No.: US 10,078,436 B2
(45) Date of Patent: Sep. 18, 2018

(54) USER INTERFACE ADJUSTING METHOD AND APPARATUS USING THE SAME (71) Applicant: HTC CORPORATION, Taoyuan (TW)

(72) Inventors: Kuei-Tuan Wu, New Taipei (TW); Wei-Nien Shih, New Taipei (TW); Bo-Cheng Chen, New Taipei (TW); Chia-Jui Wu, New Taipei (TW); Pei-Chi Chang, New Taipei (TW)

(73) Assignee: HTC Corporation, Taoyuan (TW)

( * ) Notice: Subject to any disclaimer, the term of this patent is extended or adjusted under 35 U.S.C. 154(b) by 295 days.

(21) Appl. No.: 14/927,033

(22) Filed: Oct. 29, 2015

(65) Prior Publication Data
US 2016/0246491 A1 Aug. 25, 2016

Related U.S. Application Data

(60) Provisional application No. 62/120,831, filed on Feb. 25, 2015, provisional application No. 62/120,836, filed on Feb. 25, 2015, provisional application No. 62/120,843, filed on Feb. 25, 2015.

(51) Int. Cl.
*G06F 3/048* (2013.01)
*G06F 3/0484* (2013.01)
*G06F 3/0481* (2013.01)

(52) U.S. Cl.
CPC ...... *G06F 3/04847* (2013.01); *G06F 3/04817* (2013.01); *G06F 3/04842* (2013.01)

(58) Field of Classification Search
CPC .............. G06F 3/04847; G06F 3/04817; G06F 3/04842
See application file for complete search history.

(56) References Cited

U.S. PATENT DOCUMENTS

| | | | | | |
|---|---|---|---|---|---|
| 5,371,844 | A | * | 12/1994 | Andrew | G06F 3/0486 715/747 |
| 5,603,053 | A | * | 2/1997 | Gough | G06F 3/0481 345/156 |
| 5,802,361 | A | * | 9/1998 | Wang | G06F 17/30256 379/202.01 |
| 2007/0176945 | A1 | * | 8/2007 | Moran | G06F 9/451 345/594 |
| 2008/0201649 | A1 | * | 8/2008 | Mattila | G06F 3/04817 715/763 |
| 2009/0172577 | A1 | | 7/2009 | Kim et al. | |

(Continued)

FOREIGN PATENT DOCUMENTS

WO WO 2014/080064 A1 5/2014

OTHER PUBLICATIONS

European Office Action, dated Jun. 2, 2017, for European Application No. 15195135.7.

*Primary Examiner* — Nicholas Augustine
(74) *Attorney, Agent, or Firm* — Birch, Stewart, Kolasch & Birch, LLP (57) ABSTRACT

The disclosure provides a method for adjusting a user interface (UI) of an electronic apparatus. The method includes following steps: analyzing color information of an image; generating a first palette having at least one first pilot color based on the color information of the image; and performing a color scheme in at least one page of the user interface according to the first palette having the at least one first pilot color.

20 Claims, 7 Drawing Sheets

(56) References Cited

U.S. PATENT DOCUMENTS

| | | | |
|---|---|---|---|
| 2010/0257469 A1* | 10/2010 | Kim | G06F 9/451 |
| | | | 715/763 |
| 2012/0313962 A1 | 12/2012 | Hsu et al. | |
| 2014/0037200 A1* | 2/2014 | Phillips | G06T 7/90 |
| | | | 382/162 |
| 2014/0075324 A1 | 3/2014 | Howard et al. | |

* cited by examiner

USER INTERFACE ADJUSTING METHOD AND APPARATUS USING THE SAME

BACKGROUND

Field of Invention

The present disclosure relates to a user interface adjusting method and apparatus, and more particularly to a user interface adjusting method and apparatus using color information of an image.

Description of Related Art

Smart phones become more and more popular these days. However, most functions/settings of the smart phones are pre-set by the manufactures or the operating system providers. Therefore, user interfaces associated with the smart phones with the same brand usually look very similar. However, some users such as young generation users may not be satisfied with the pre-set functions/settings, and would like to create their own styles/characteristics. Therefore, how to provide a mechanism to allow the users to configure the user interface of their own smart phones is an important issue to be resolved.

SUMMARY

The disclosure provides a method for adjusting a user interface (UI) of an electronic apparatus. The method includes: analyzing color information of an image; generating a first palette having at least one first pilot color based on the color information of the image; and performing a color scheme in at least one page of the user interface according to the first palette having the at least one first pilot color.

The disclosure provides an electronic apparatus for adjust a user interface. The electronic apparatus includes an analyzing unit, a processor, and a display unit. The processor is coupled to the analyzing unit. The display unit is coupled to the processor. The processor is operatively configured to analyze color information of an image. The processor is operatively configured to generate a first palette having at least one first pilot color based on the color information of the image and perform a first color scheme in at least one page of the user interface according to the first palette having the at least one first pilot color. The display unit is operatively configured to display the user interface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The disclosure will become more fully understood from the detailed description given hereinbelow and the accompanying drawings which are given by way of illustration only, and thus are not limitative of the present invention, and wherein.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts. It will be understood that, in the description herein and throughout the claims that follow, the phrase "and/or" includes any and all combinations of one or more of the associated listed items.

Figure 1:
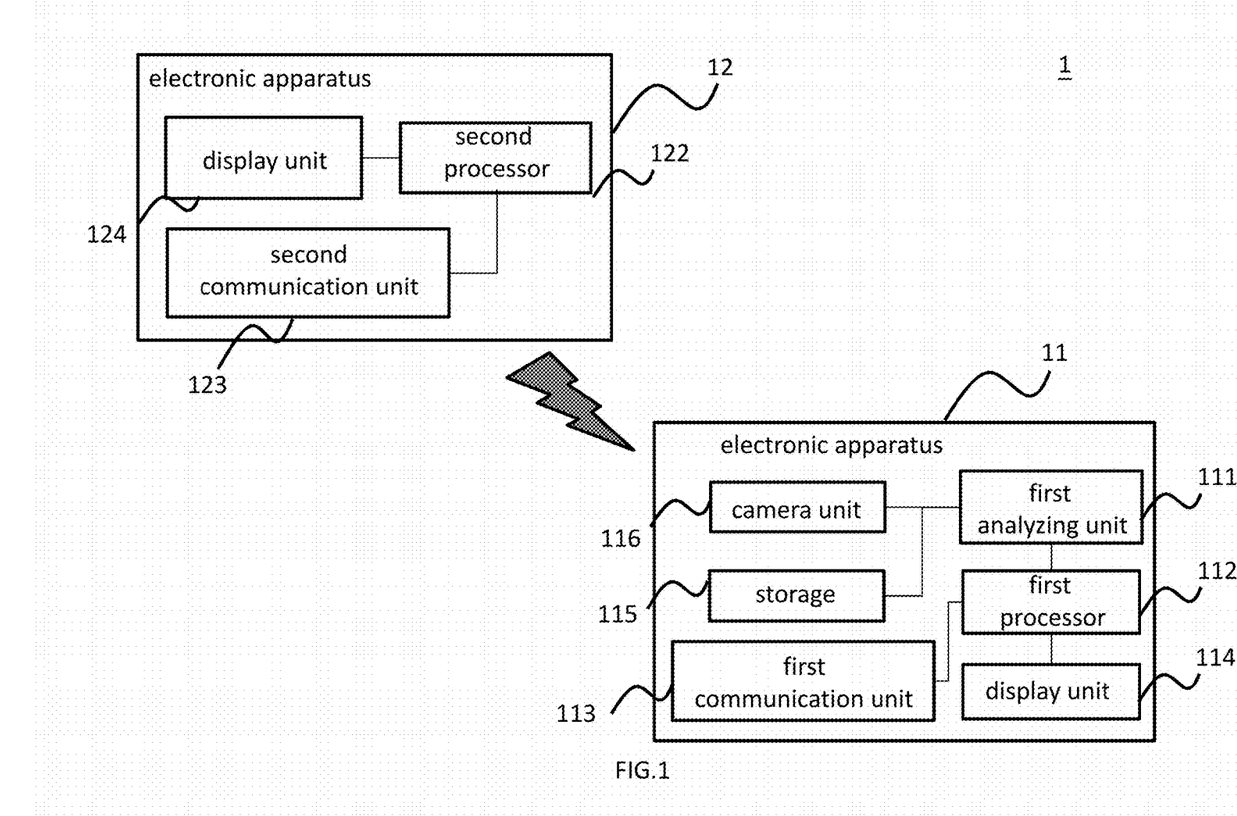
FIG. 1 is a schematic diagram illustrating a user interface adjusting system according to an embodiment of the disclosure.

Please refer to FIG. 1, which is the schematic diagram illustrating the user interface adjusting system according to an embodiment. The user interface adjusting system 1 includes electronic apparatuses 11 and 12. The electronic apparatus 11 includes a first analyzing unit 111, a first processor 112, a first communication unit 113, a display unit 114, storage 115, and a camera unit 116. The electronic apparatus 12 includes a second processor 122, a second communication unit 123, and a display unit 124. In the embodiment, the electronic apparatus 11 and the electronic apparatus 12 communicate with each other through the first communication unit 113 and the second communication unit 123, respectively.

Within the electronic apparatus 11, the first processor 112, the storage 115, and the camera unit 116 are coupled to the first analyzing unit 111. The communication unit 113, and the display unit 114 are coupled to the first processor 112. Within the electronic apparatus 12, the second communication unit 123 and the display unit 124 are coupled to second processor 122.

In an embodiment, the electronic apparatus 11 is implemented by a mobile device such as a smart phone. The first analyzing unit 111 comprises suitable circuitry, logic, and/or code, which is operatively configured to analyze color information of an image. The first analyzing unit 111 samples a plurality of pixels of the image thereby generating sampled pixels, and groups the sampled pixels into a plurality of pixel sets. In an embodiment, the color information is a value of Red-Green-Blue model (RGB) of the sampled pixels. In another embodiment, the color information can be a value of Hue-Saturation-Value color model (HSV) or Hue-Saturation-Brightness model (HSB) of the sampled pixels.

The first processor 112 comprises suitable circuitry, logic, and/or code, which is operatively configured to generate a first palette having at least one first pilot color based on the color information of the image. In an embodiment, the first processor 112 calculates the color information (e.g., the values of the RGB model or the HSV color model) of the sampled pixels for each pixel set, thereby generating the at least one first pilot color. For example, the first processor 112 calculates the first pilot color by respectively averaging red values, green values, and blue values of all sampled pixels within each pixel set when using the values of the RGB model as the color information.

Furthermore, the first processor 112 generates a second palette having at least one second pilot color based on the color information of the image. In an embodiment, the first processor 112 adjusts the value of the color information (for example, the brightness value, the saturation value, or the hue value) of the at least one first pilot color of the first palette to generate the second palette having the at least one second pilot color. Taking the HSB model as an example, the first processor 112 adjusts the brightness values of all first pilot colors by "+10", adjusts the saturation values of all first pilot colors by "+30", and/or adjusts the hue values of all first pilot colors by "−15" to generate the second palette. In an embodiment, the first processor 112 can, but is not limited to, adjust the brightness values of two first pilot colors only. In an embodiment, the values for adjusting the brightness, the saturation and the hue values are not limited to the abovementioned "+10", "+30" and "−15". These values can be pre-set by the operating system provider or generated randomly by the first processor 112.

In addition, the first processor 112 is operatively configured to perform a first color scheme in at least one page of the user interface according to the first palette having the at least one first pilot color. In an embodiment, the first processor 112 colors at least one color block of the at least one page with the at least one first pilot color in the step of performing the color scheme in the at least one page of the user interface. In an embodiment, the at least one color block includes one or more of a status bar or a background of the at least one page.

The first communication unit 113 comprises suitable circuitry, logic, and/or code, which is operatively configured to transmit data such as the first palette having the at least one first pilot color or the image to the electronic apparatus 12 through the second communication unit 123, and/or receive the data from the electronic apparatus 12 through the second communication unit 123.

The display unit 114 comprises suitable circuitry, logic, and/or code, which is operatively configured to display the user interface. In an embodiment, the display unit 114 is implemented by a touch display screen. The storage 115 comprises suitable circuitry, logic, and/or code, which is operatively configured to store the image captured by the camera unit 116 or other image sources received through the first communication unit 113. The camera unit 116 comprises suitable circuitry, logic, and/or code, which is operatively configured to capture the image and then deliver to the first analyzing unit 111 for analyzing.

In an embodiment, the electronic apparatus 11 can operate the whole functions without the electronic apparatus 12. However, in another embodiment, the electronic apparatus 12 is implemented by another smart phone. In an embodiment, the second processor 122, the second communication unit 123, and the display unit 124 operate in the same way as the first processor 111, the first communication unit 113, and the display unit 114, and therefore will not be explained hereafter.

In an embodiment, the second communication unit 123 of the electronic apparatus 12 receives the first palette having the at least one first pilot color from the electronic apparatus 11. Then, the electronic apparatus 12 performs the color scheme in the at least one page of the user interface according to the first palette having the at least one first pilot color. In other words, the first palette having the at least one first pilot color is calculated by the electronic apparatus 11 and performed on the electronic apparatus 12. In an embodiment, the electronic apparatus 12 also can receive the first palette having the at least one first pilot color from another device such as a cloud server or a personal computer.

Figure 2:
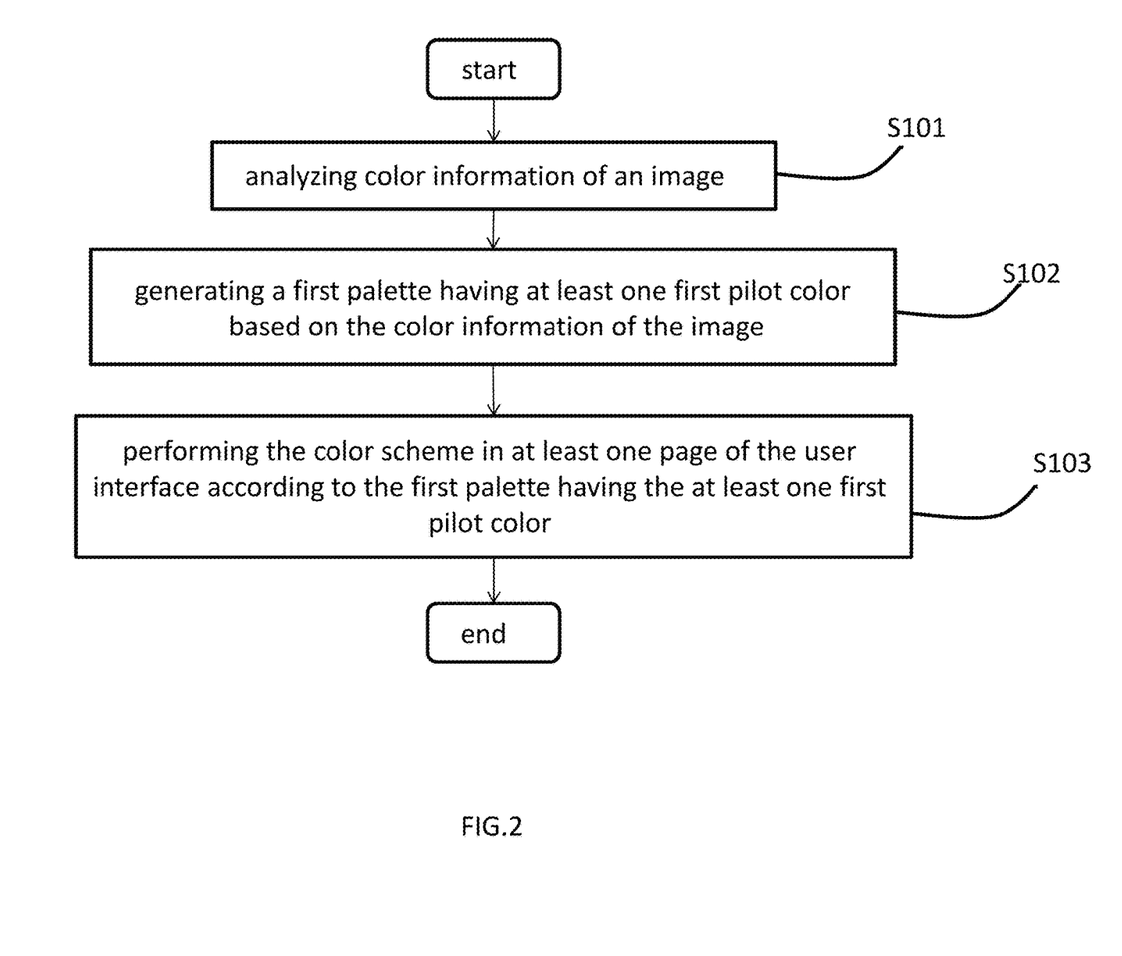
FIG. 2 is a flow chart illustrating a method for adjusting a user interface of an electronic apparatus according to an embodiment of the disclosure.

Please refer to FIG. 2, which is a flow chart illustrating a method for adjusting a user interface of an electronic apparatus according to an embodiment of the disclosure. The method includes analyzing color of information of an image (S101); generating first palette having at least one first pilot color based on the color information of the image (S102); performing the color scheme in at least one page of the user interface according to the first palette having the at least one first pilot color (S103).

Please refer to FIG. 2 in conjunction with FIG. 1. In the step S101, the first analyzing unit 111 analyzes color information of an image. Furthermore, the first analyzing unit 111 samples a plurality of pixels of the image thereby generating sampled pixels, and groups the sampled pixels into a plurality of pixel sets. In an embodiment, the color information is a value of RGB of the sampled pixels. However, other types of the color information such as the value of HSV or HSB of the sampled pixels can also be used.

Figure 3A:
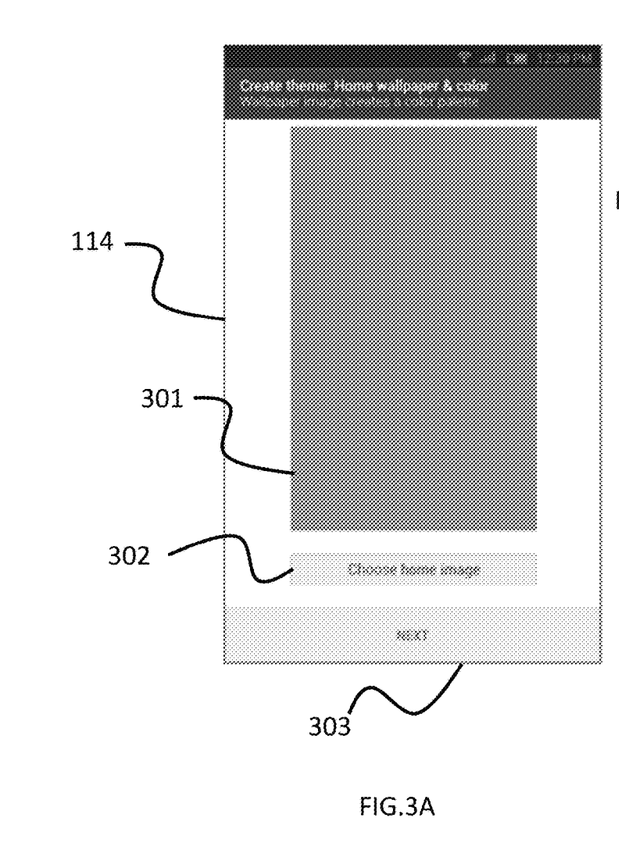
FIG. 3A is a schematic diagram illustrating a step of selecting an image according to an embodiment of the disclosure.

Please refer to FIG. 3A in conjunction with FIGS. 1 and 2. FIG. 3A is a schematic diagram illustrating a step of selecting an image according to an embodiment. In an embodiment, before the step S101, the display unit 114 of the electronic apparatus 11 will display an operating function including a button 302 on the touch display screen and provide the function of selecting the image from the storage 115 (or the function capturing the image from the camera unit 116) for the user. The display unit 114 displays a selected image on an image region 301. Then, the user can go to the next step by pressing/touching a button 303.

In the step S102, the first processor 112 generates a first palette having at least one first pilot color based on the color information of the image. In an embodiment, the first processor 112 calculates the color information of the sampled pixels for each pixel set, thereby generating the at least one first pilot color. Taking the RGB model for the example, the first processor 112 calculates the first pilot color by respectively averaging red values, green values, and blue values of all sampled pixels within each pixel set. In another embodiment, the first pilot color is calculated in accordance with a median of the sampled pixels associated with each pixel set.

In an embodiment, after the step S102, the first processor 112 creates a preview of the at least one page of the user interface with the color scheme, and the display unit 114 shows the preview on the display unit 114. In an embodiment, the electronic apparatus 11 will generate a second palette having at least one second pilot color based on the color information (for example, the brightness value, the saturation value, or the hue value) of the at least one first pilot color of the first palette in response to receiving a reselection signal. That is, the color information including the brightness value, the saturation value, and/or the hue value of the at least one first pilot color of the first palette can be utilized to generate the second palette.

In an embodiment, the electronic apparatus 11 will show a reselection button (not illustrated) on the screen for the user. If the user does not like the first palette having the at least one pilot color, the user can touch the reselection button to generate the reselection signal for reselection. For example, in respond to receiving the reselection signal, the first processor 112 may adjust the brightness values of all first pilot colors by "+10", adjusts the saturation values of all first pilot colors by "+30", and/or adjusts the hue values of all first pilot colors by "−15" to generate the pilot colors of the second palette. It is noted that the values for adjusting the brightness, the saturation and the hue values are not limited to the abovementioned "+10", "+30" and "−15". These values can be pre-set by the operating system provider or generated randomly by the first processor 112.

Figure 3B:
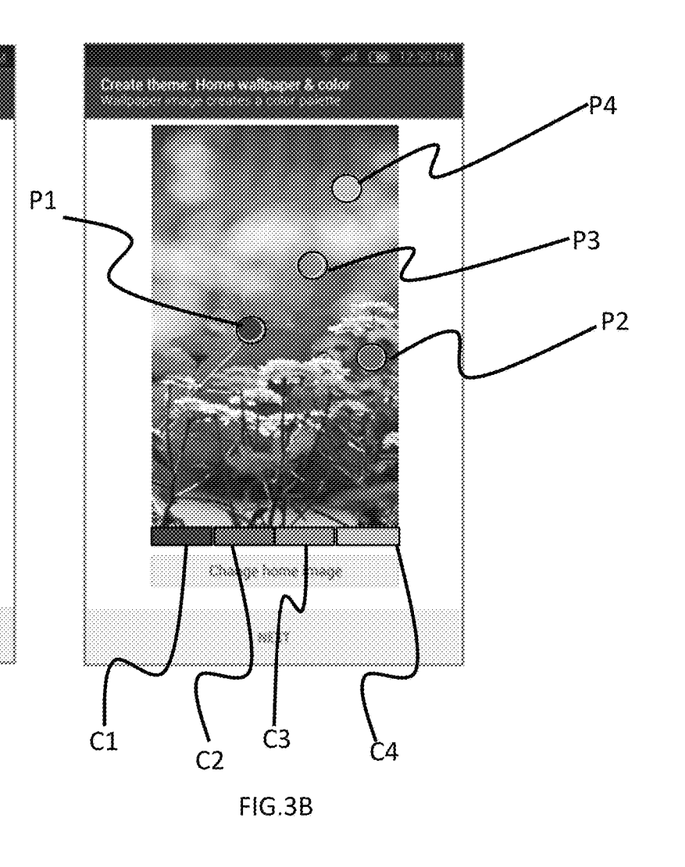
FIG. 3B is a schematic diagram illustrating a step of analyzing color information of the image according to an embodiment of the disclosure.

Please refer to FIG. 3B in conjunction with FIG. 1 and FIG. 2. FIG. 3B is a schematic diagram illustrating a step of analyzing color information of the image according to an embodiment. The first processor 112 will show the first pilot colors C1-C4 and show color locations P1-P4 corresponding the first pilot colors C1-C4 on the selected image.

In an embodiment, a user may have more than one mobile device such as a smart phone and a tablet PC, or two smart phones. Therefore, in an embodiment, the electronic apparatus 11 transmits the first palette having the at least one first pilot color (e.g., ".theme" file format) through the first communication unit 113 to the electronic apparatus 12 the user owns. Thereafter, the color scheme can be performed/applied onto the user's mobile devices, so as to illustrate the individual characteristics/styles of the user.

In the step S103, the first processor 112 performs the color scheme in at least one page of the user interface according to the first palette having the at least one first pilot color. In an embodiment, the first processor 112 further colors at least one color block of the at least one page with the at least one first pilot color in the step of performing the color scheme in the at least one page of the user interface. In an embodiment, the at least one color block includes one or more of a status bar or a background of the at least one page. In an embodiment, the at least one page comprises one or more of a home page or an application page. In an embodiment, the application page comprises one or more of a phone page, a message page, a mail page, or a news page.

Figures 4A, 4B:
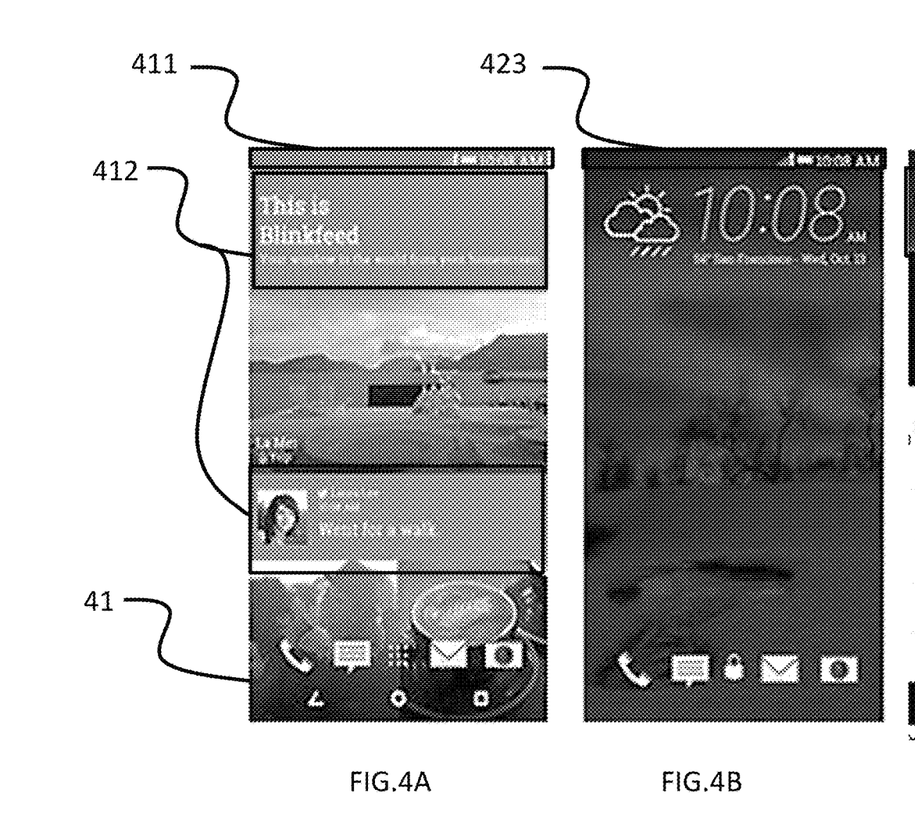
FIGS. 4A-4C are schematic diagrams illustrating an adjusted user interface according to an embodiment of the disclosure.
Figure 4C:
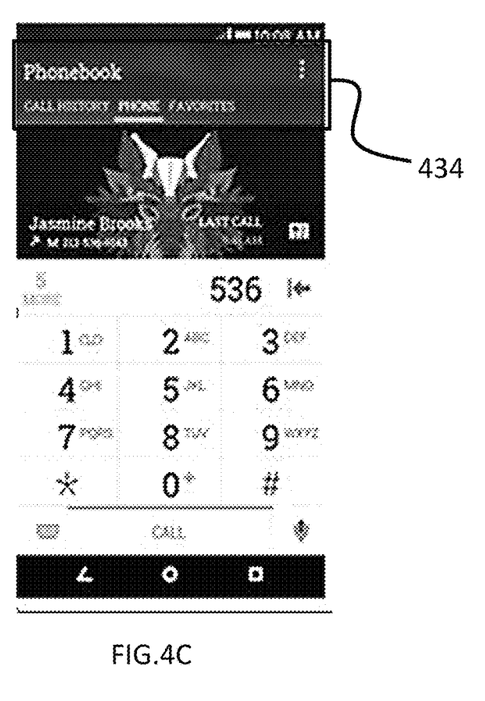

Please refer to FIGS. 4A-4C in conjunction with FIG. 2. FIGS. 4A-4C are schematic diagrams illustrating an adjusted user interface according to an embodiment. The color scheme is performed to the color status bars 411, 423, and the background 412 of the at least one page 41, such as a background of a phone page 434, a message page, a mail page, and/or a news page. However, the first processor 112 colors the at least one color block according to the color scheme for the at least one block of the user interface predetermined by the operator. In another embodiment, the at least one block of the user interface can also be predetermined by the user.

In another embodiment, the first processor 112 can also operatively configure application icons of the user interface of the electronic apparatus 112 according to the first palette having the at least one first pilot color after the step S102. In an embodiment, the first processor 112 configures the at least one application icon according to the one of at least one icon pattern that is selected.

Figure 5:
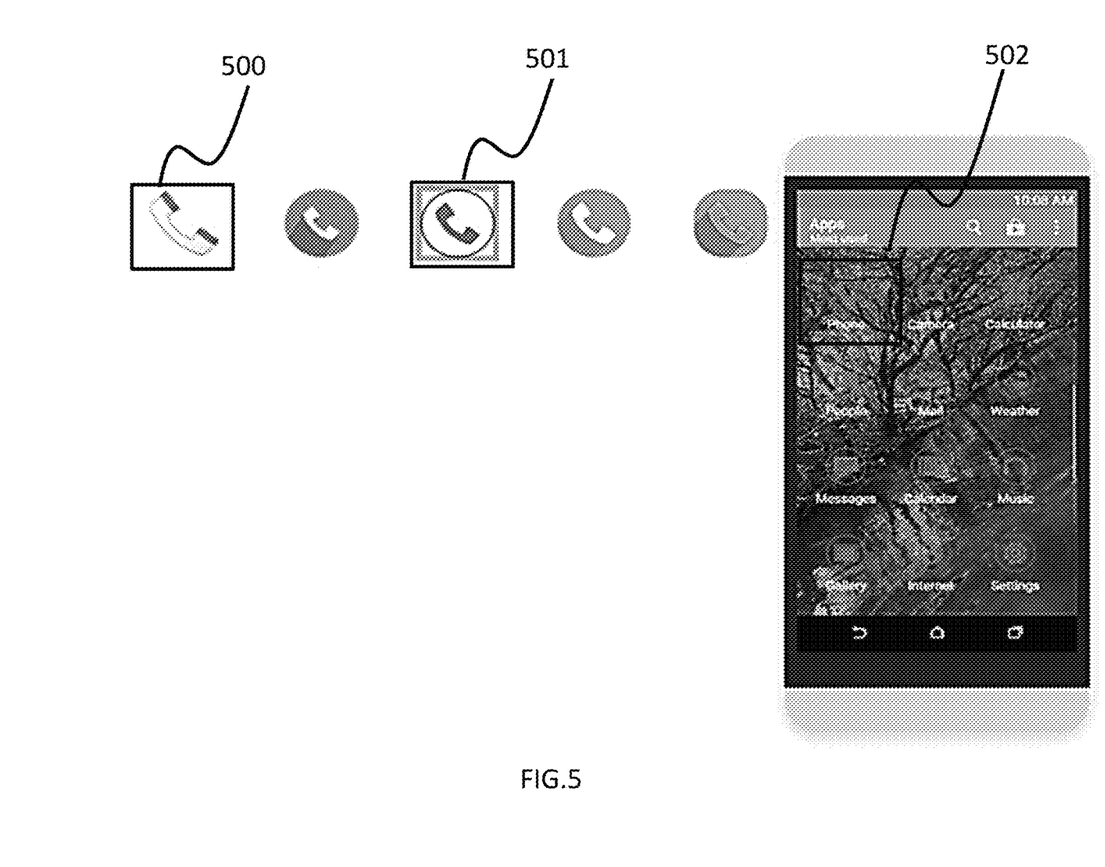
FIG. 5 is a schematic diagram illustrating a step of selecting an icon pattern according to an embodiment of the disclosure.

Please refer to FIG. 5 in conjunction with FIG. 1 and FIG. 2. FIG. 5 is a schematic diagram illustrating a step of selecting an icon pattern according to an embodiment. In an embodiment, the display unit 114 will show four icon patterns corresponding to the first palette having four first pilot colors on the screen. The user can select one of four icon patterns 501 to configure all application icons or only one application icon. In other words, the icon pattern 500 will be replaced by the icon pattern 501.

In an embodiment, the electronic apparatus 11 classifies the application icons into at least one classified group according to a default setting. In an embodiment, after the step S102, the first processor 112 replaces the skin color of the application icons associated with the at least one classified group according to the first palette having the at least one first pilot color. In an embodiment, the at least one classified group comprises one or more of a multi-media classification (such as music player, movie player, or etc.), a communication classification (such as phone, mail, social network, or etc.), an amusement classification (such as game, tools, or etc.) or an essential classification (such as setting, calendar, or etc.).

In another embodiment, the first processor 112 can also operatively configures at least one notification sound or ring tone of the electronic apparatus 112 according to the first palette having the at least one first pilot color after the step S102. In an embodiment, the first processor 112 firstly selects one of a plurality of hue sections on a Hue cycle according to the at least one first pilot color selected in the step S102. Secondly, the first processor 112 configures at least one notification sound or ring tone of the electronic apparatus 11 according to the one of a plurality of hue sections that is selected.

Figure 6A:
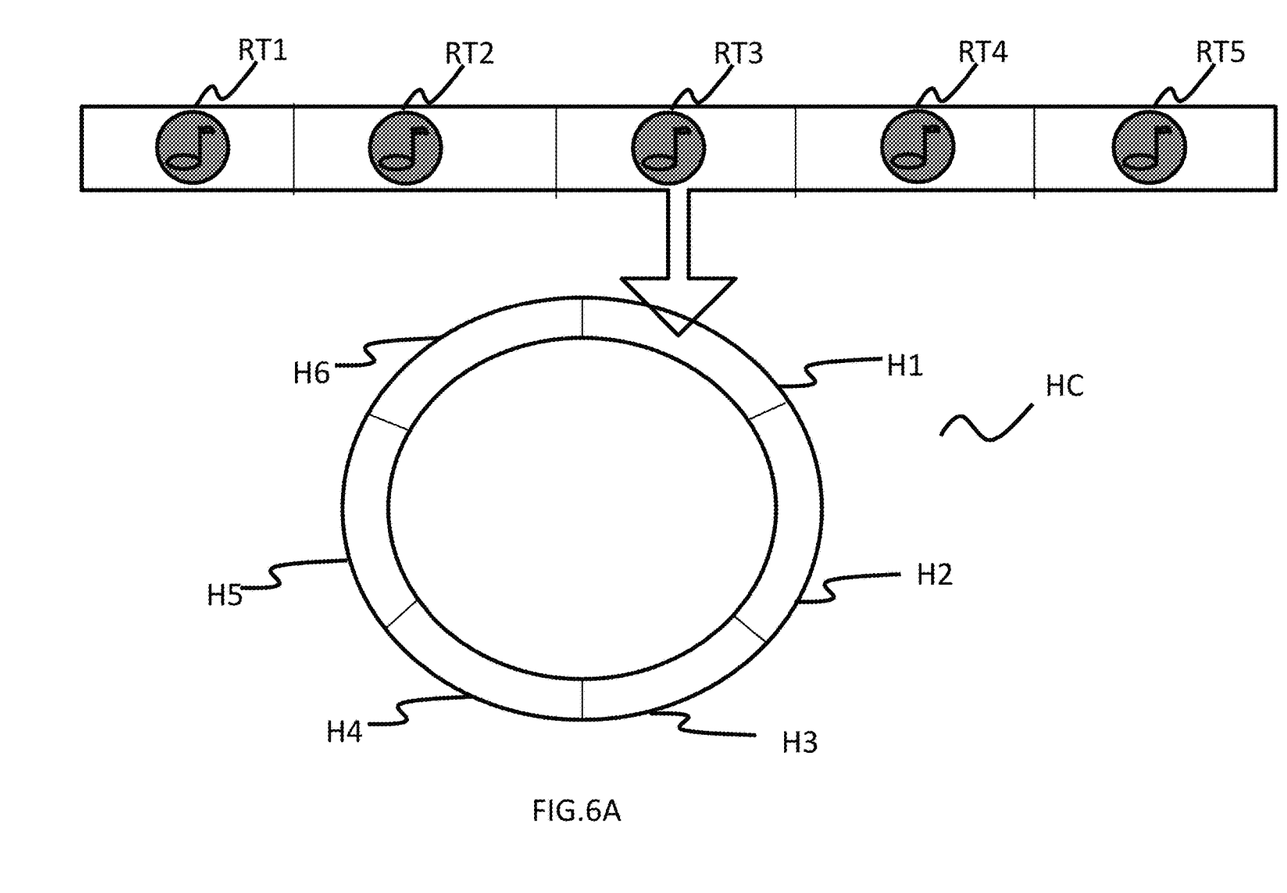
FIG. 6A is a schematic diagram illustrating a Hue cycle including a plurality of hue sections according to an embodiment of the disclosure.
Figure 6B:
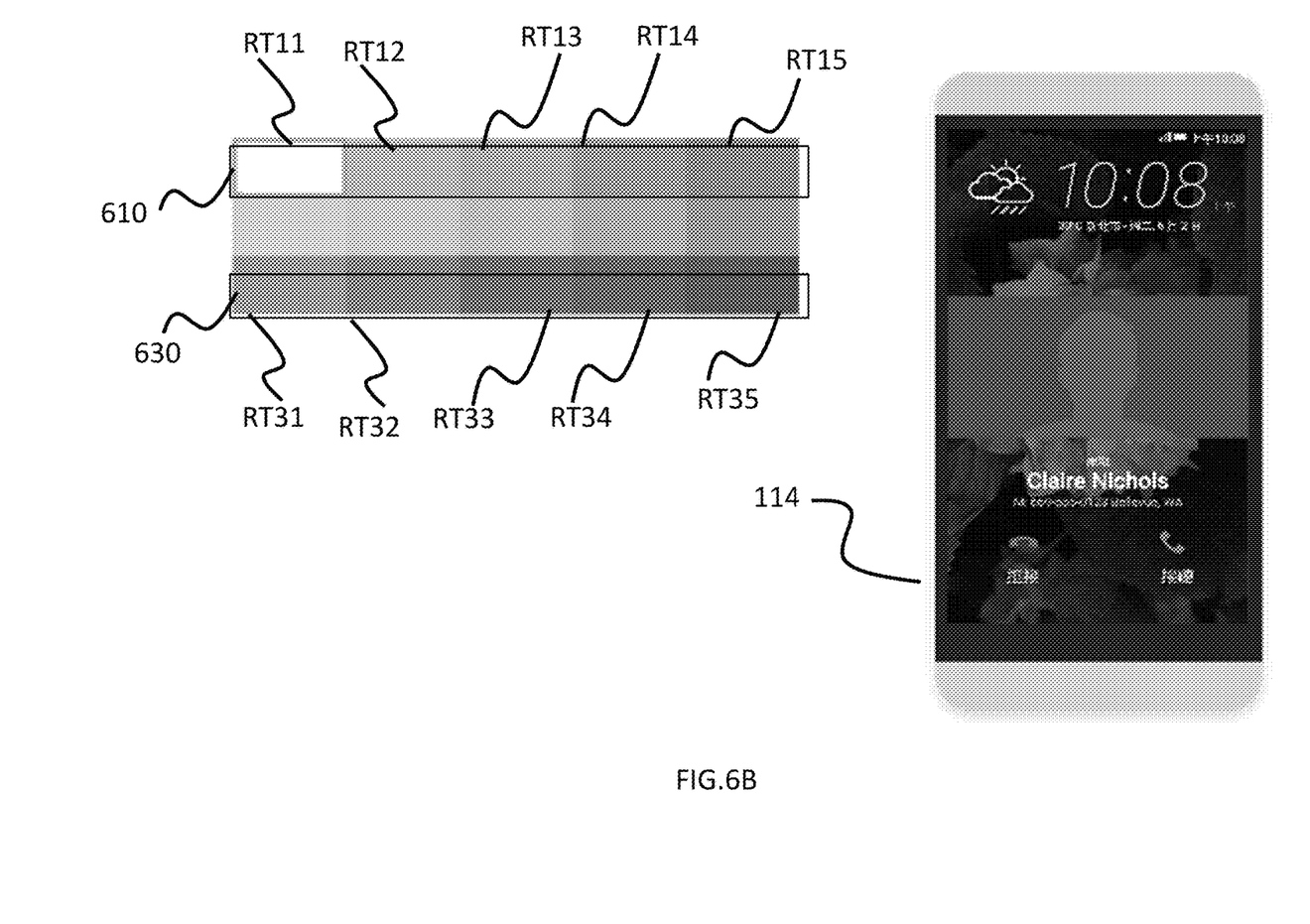
FIG. 6B is a schematic diagram illustrating a step of selecting a notification sound of the electronic apparatus according to an embodiment of the disclosure.

Please refer to FIGS. 6A-6B in conjunction with FIG. 1 and FIG. 2. FIG. 6A is a schematic diagram illustrating a Hue cycle including a plurality of hue sections according to an embodiment of the disclosure. FIG. 6B is a schematic diagram illustrating a step of selecting an icon pattern according to an embodiment. In an embodiment, the electronic apparatus 11 not only performs the color scheme according to the first palette having the at least one first pilot color to color the color blocks of the user interface, but also immediately selects the notification sounds from hue sections corresponding to each at least one first pilot color of the first palette, thereby showing buttons on the display unit 114 for the user's selection.

In an embodiment, a notification sound including one or more of a cellphone bell, a text tone, or an alarm sound can be selected from ringtones. In an embodiment, the operating system provider categorizes a plurality of ringtones into corresponding hue sections H1-H6 of a Hue Cycle HC beforehand. As shown in FIG. 6A and FIG. 6B, the ringtones RT11-RT15 can be pre-categorized into the hue section H1, and other ringtones can be respectively pre-categorized into the hue sections H2, H3, H4, H5, and H6 (e.g., RT31-RT35 can be pre-categorized into the hue section H3).

As an example, a cellphone bell can be determined as follows: the first processor 112 generates the first palette having at least one first pilot color, in which the first pilot color corresponds to one of the hue sections H1-H6, say, H1 for example; since the ringtones being pre-categorized into the hue section H1 are ringtones RT11-RT15, a ringtone bar 610 comprising ringtones RT11-RT15 is displayed on the screen (e.g., display unit 114) such that an user can select a cellphone bell from one of ringtones RT11-RT15.

As another example, an alarm sound can be determined as follows: the first processor 112 generates the first palette having at least one first pilot color, in which the first pilot color corresponds to one of the hue sections H1-H6, say, H3 for example; since the ringtones being pre-categorized into the hue section H3 are ringtones RT31-RT35, a ringtone bar 630 comprising ringtones RT31-RT35 is displayed on the screen (e.g., display unit 114) such that an user can select an alarm sound from one of ringtones RT31-RT35.

In an embodiment, there may be some relation between the sound-effect levels of ringtones RT11-RT15 or ringtones RT31-RT35. For example, the sound-effect levels of ringtones RT11-RT15 or ringtones RT31-RT35 can be either ascending (i.e., from light to heavy), or descending (i.e., from heavy to light).

It should be noted that the number of the hue sections is not limited to 6, and the number of ringtones corresponding to each hue section is not limited to 5. In an embodiment, the number of the hue sections and the number of ringtones corresponding to each hue section can be pre-set by the operating system provider.

In another embodiment, the first palette may have a plurality of first pilot color, in which the plurality of first pilot colors correspond to a plurality of hue sections, say, hue sections H1 and H3 for example. In this embodiment, ringtone bars 610 and 630 (corresponding to hue sections H1 and H3, respectively) can be simultaneously shown on the display unit 114 for the user to select a cellphone bell, a text tone, or an alarm sound from ringtones RT11-RT15 and RT31-RT35.

In addition, one or more of the illustrated embodiments can be combined together. For example, in one embodiment, after the first palette having the at least one first pilot colors is generated, the at least one color block of the at least one page, the notification sound, the icon pattern of the application icons, and/or skin color of application icons can be configured according to the first palette. In another embodiment, the color scheme can be immediately performed to configure the at least one color block of the at least one page, the notification sound, the icon pattern of the application icons, and/or skin color of application icons for the electronic apparatus 11. In still another embodiment, the first palette can be transmitted to more than one mobile device the user owns, such that the user can set up the mobile devices with his/her own characteristics/styles.

The user interface adjusting method and apparatus disclosed in the present disclosure provide a mechanism to automatically generate recommended pilot colors for coloring color blocks of user interface pages based on the analyzed color information of the image. Moreover, the present disclosure further provides a mechanism to adjust the skin color of the application icons, the icon patterns or notification sounds of the smart phone according to the recommended pilot colors. Thus, the present disclosure can provide a flexible user interface of the smart phone to make personal characteristics/styles for each user.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for adjusting a user interface (UI) of an electronic apparatus, comprising:
analyzing color information of an image;
generating a first palette having a plurality of first pilot colors based on the color information of the image; and
performing a color scheme in at least one page of the user interface according to the first palette having the plurality of first pilot colors, the at least one page including a plurality of application icons, the step of preforming the color scheme comprises:
for at least one of the plurality of application icons, displaying a plurality of candidate icon patterns corresponding to the plurality of first pilot colors respectively for a user to select one candidate icon pattern out of the plurality of candidate icon patterns; and
configuring the at least one of the plurality of application icons according to the selected candidate icon pattern, wherein the at least one page comprises a home page and an application page.

2. The method of claim 1, wherein the step of performing the color scheme in the at least one page of the user interface comprises coloring at least one color block of the at least one page with the at least one first pilot color.

3. The method of claim 2, wherein the at least one color block comprises one or more of a status bar or a background of the at least one page.

4. The method of claim 1, wherein the application page comprises one or more of a message page, a mail page, or a news page.

5. The method of claim 1, before the step of analyzing the color information of the image, further comprising: sampling a plurality of pixels of the image thereby generating sampled pixels; and grouping the sampled pixels into a plurality of pixel sets.

6. The method of claim 5, wherein the step of generating the first palette having the plurality of first pilot colors based on the color information of the image comprises:
calculating the color information of the sampled pixels for each pixel set thereby generating the plurality of first pilot colors.

7. The method of claim 6, wherein the color information is a value of Red-Green-Blue model of the sampled pixels or a value of Hue-Saturation-Value color model of the sampled pixels.

8. The method of claim 7, wherein each of the plurality of first pilot colors is calculated by respectively averaging red values, green values, blue values of all sampled pixels within each pixel set.

9. The method of claim 6, wherein each of the plurality of first pilot colors is calculated in accordance with a median of the sampled pixels associated with each pixel set.

10. The method of claim 1, further comprising:
configuring at least one notification sound of the electronic apparatus according to the first palette having the plurality of first pilot colors.

11. The method of claim 10, further comprising:
selecting one of a plurality of hue sections on a Hue cycle according to the plurality of first pilot colors; and
configuring at least one notification sound of the electronic apparatus according to the one of a plurality of hue sections that is selected.

12. The method of claim 10, wherein each hue section associates with a music box having at least one ringtone for selection.

13. The method of claim 10, wherein the notification sound comprises one or more of a cellphone bell, a text tone, or an alarm sound.

14. The method of claim 1, further comprising: generating a second palette having at least one second pilot color based on the color information of the image.

15. The method of claim 14, wherein the step of generating a second palette having at least one second pilot color comprises adjusting a value of the color information of the plurality of first pilot colors of the first palette.

16. The method of claim 1, wherein the user interface has a plurality of application icons, further comprises:
classifying the application icons into at least one classified group; and
replacing the skin color of the application icons associated with the at least one classified group according to the first palette having the plurality of first pilot colors.

17. The method of claim 16, wherein the at least one classified group comprises one or more of a multi-media classification, a communication classification, an amusement classification or an essential classification.

18. The method of claim 1, further comprising: creating a preview of the at least one page of the user interface with the color scheme; and generating a second palette having at least one second pilot color based on the color information of the image in response to receiving a reselection signal.

19. An electronic apparatus for adjusting a user interface, comprising:
an analyzing unit, operatively configured to analyze color information of an image;
a processor, coupled to the analyzing unit, and operatively configured to:
generate a first palette having a plurality of first pilot colors based on the color information of the image; and
perform a first color scheme in at least one page of the user interface according to the first palette having the plurality of first pilot colors, the at least one page including a plurality of application icons, wherein for at least one of the plurality of application icons, the processor is further operatively configured to display a plurality of candidate icon patterns corresponding to the plurality of first pilot colors respectively for a user to select one candidate icon pattern out of the plurality of candidate icon patterns, and configure the at least one of the plurality of application icons according to the selected candidate icon pattern; and
a display unit, coupled to the processor, operatively configured to display the user interface,
wherein the at least one page comprises a home page and an application page.

20. The electronic apparatus of claim 19, wherein the processor that is configured to perform the first color scheme in the at least one page of the user interface is further operatively configured to color at least one color block of the at least one page with the plurality of first pilot colors.

* * * * *